Feb. 22, 1927.
E. AMMANN-HABERSTICH
1,618,903
METHOD AND APPARATUS FOR MANUFACTURING GLUED BINDING TAPE
Filed Aug. 30, 1923
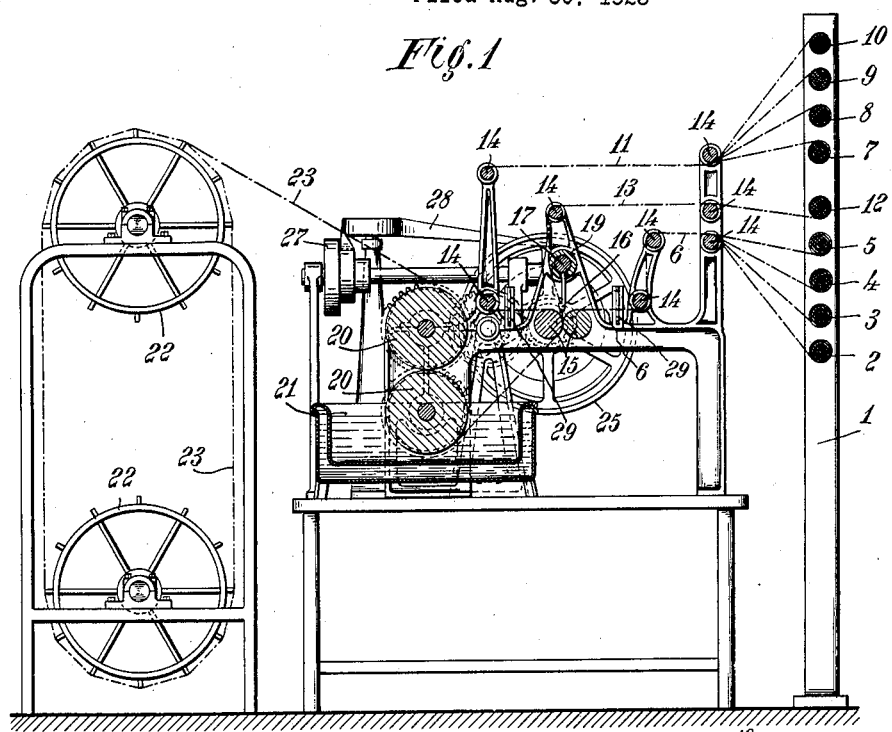
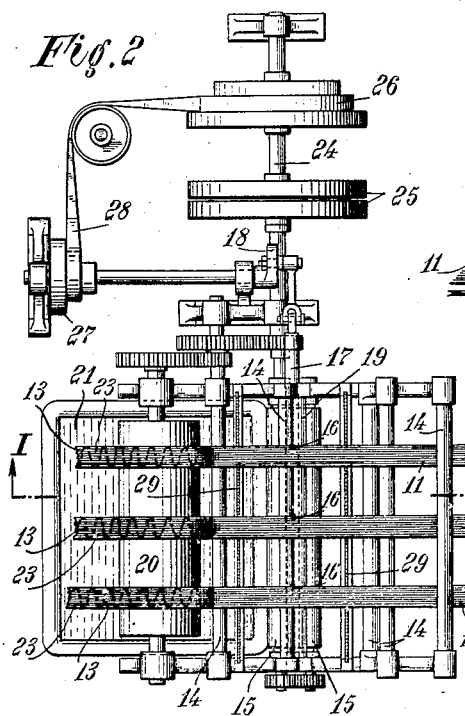
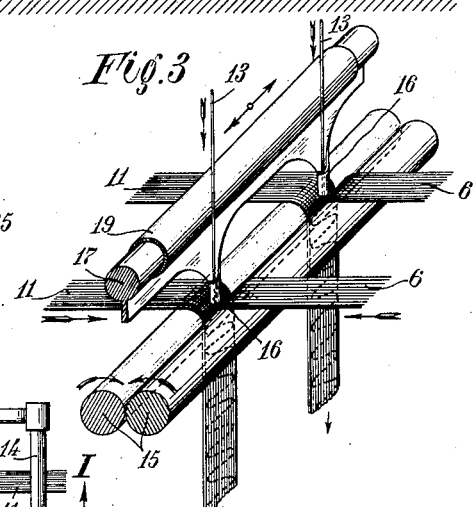
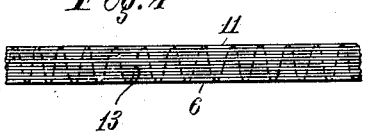
Inventor:
Ernst Ammann-Haberstich
By Kenny Orth
Atty.

Patented Feb. 22, 1927.

1,618,903

UNITED STATES PATENT OFFICE.

ERNST AMMANN-HABERSTICH, OF BASEL, SWITZERLAND.

METHOD AND APPARATUS FOR MANUFACTURING GLUED BINDING TAPE.

Application filed August 30, 1923, Serial No. 660,181, and in Germany September 18, 1922.

The glued binding tapes, also called bast tapes, used hitherto have only longitudinal threads glued parallel to one another in one layer. This method has the disadvantage that tapes of this kind, especially if made in great widths, easily split.

The present invention has for its object a method for manufacturing a glued binding tape which does not have the above mentioned disadvantage. In this tape, at least one cross thread is inserted to and fro between two layers of longitudinal threads whereupon this whole texture is pressed and glued together so as to form a tape. The cross thread or the several cross threads give a greater strength to the tape, especially a greater resistance to longitudinal splitting. Tapes of this kind can be made in an apparatus or in a machine provided with certain organs, such as rollers, causing separate layers of longitudinal threads to be placed upon one another. Furthermore, these apparatus or machines are provided with thread guides for one or several cross threads to be inserted between the layers, said guides being moved to and fro, transversely to the longitudinal threads at the junction point of the latter. Besides this, the apparatus or machine is equipped with a gluing mill pressing and gluing all the threads together.

One embodiment of the invention is illustrated by way of example in the accompanying drawings.

In these drawings:

Fig. 1 shows a vertical section of the apparatus, along line I—I in Fig. 2.

Fig. 2 is a plan of a portion of Fig. 1.

Fig. 3 is the perspective view of a portion of the apparatus drawn to a larger scale, and Fig. 4 shows a piece of a binding tape made in this apparatus.

The bobbin stand 1 carries the bobbins 2 to 5 for the longitudinal threads of a layer 6, furthermore the bobbins 7 to 10 for the threads of another layer 11 and bobbin 12 for the cross thread 13. All the threads pass over thread bars 14, the layers 11 and 6 being led from different sides to two rollers 15 which rotate in opposite directions. The cross thread 13 is led to a thread guide 16 secured to a bar 17 which is moved to and fro by means of a crank 18 in a tube 19 above the junction point of the layers 11 and 6. 20 are pressing and gluing rollers, the lower of which dips into the basin 21 filled with gluing liquid. 22 is a drying reel provided for the purpose of drying the tape 23 after it has been glued.

The main shaft 24, driven by the pair of belt pulleys 25, produces all movements, partly by a gear of step pulleys 26, 27 with belt 28 in order to enable the amount of movement of the thread guide 16 and of the thread 13 to be varied.

The machine works as follows:

When the rollers 15 rotate in opposite directions, the layers 6 and 11 drawn in by the rollers are caused to pass between them and are placed upon and in one another. The latter occurs if reeds 29 are provided which guide the longitudinal threads in such a manner that, for instance, the threads of layer 6 come to be embedded in the intervals of those of layer 11. However, previous to this, the thread guide 16 places the cross thread 13 zigzag between the layers 6 and 11, thus causing the cross threads 13 to be pinched between these two layers. All the threads after being pinched together are passed into the receptacle 21 containing the gluing material, and they are pressed and glued together so as to form a flat tape.

As may be seen from Fig. 3, several tapes can be made, side by side, on the rollers in one apparatus; in this case, however, a number of thread guides corresponding to the number of tapes must be provided. The threads can have one or several colours and be, for instance, of cotton, silk, or the like. The tape so produced resembles a woven tape, the weft of which is not closed; it answers the purpose thereof and has moreover various advantages. First of all, it is not necessary previously to place the longitudinal threads on a warp beam, as they can be fed from the bobbins directly into the machine. Thereby, warping and re-heddling of the warp, which takes up very much time, are avoided and a continuous working is possible. Besides this, the present machine requires no pirns moving to and fro. Owing to the fact that only the thread guide is moved to and fro, the necessity of moving also a cumbrous shuttle mechanism and a pirn being thus eliminated. A very high speed, 3000 to 4000 strokes per minute for instance, can be given to the thread guide. Besides this, several tapes can be made simultaneously in the same machine,

I claim;

1. The method of manufacturing glued binding tape, which consists in arranging longitudinal threads parallel to each other in two layers for alternate positioning of the threads of the two layers, inserting a cross thread to and fro between said two layers of longitudinal threads, pressing the whole texture so that the threads of one layer are embedded between the threads of the other layer thereby interweaving the cross thread, and gluing the whole texture together.

2. The method of manufacturing glued binding tape, which consists in arranging longitudinal threads parallel to each other in two layers for alternate positioning of the threads of the two layers, inserting a cross thread to and fro between said layers of longitudinal threads before the latter are placed one upon the other, pressing the whole texture so that the threads of one layer are embedded between the threads of the other layer thereby interweaving the cross thread, and gluing the whole texture together.

3. Apparatus for manufacturing glued binding tape, comprising in combination, means to cause separate layers of longitudinal threads arranged parallel to each other to be placed one upon the other, a thread guide, and means to move the latter to and fro transversely of the longitudinal threads for inserting a cross thread between said layers of longitudinal thread, and means to press and glue all the threads together whereby the threads of one layer are embedded between the threads of the other layer and the cross thread is interwoven between the two layers.

In testimony whereof I affix my signature.

ERNST AMMANN-HABERSTICH.